US009416676B2

(12) United States Patent
Gieg et al.

(10) Patent No.: US 9,416,676 B2
(45) Date of Patent: Aug. 16, 2016

(54) GAS TURBINE

(71) Applicant: MTU Aero Engines AG, Munich (DE)

(72) Inventors: Walter Gieg, Eichenau (DE); Petra Kufner, Poing (DE); Rudolf Stanka, Rattenkirchen (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 14/584,811

(22) Filed: Dec. 29, 2014

(65) Prior Publication Data

US 2015/0192026 A1 Jul. 9, 2015

(30) Foreign Application Priority Data

Jan. 9, 2014 (EP) .................................... 14150517

(51) Int. Cl.

*F01D 5/20* (2006.01)
*F01D 11/00* (2006.01)
*F01D 11/12* (2006.01)
*F01D 25/24* (2006.01)
*F01D 25/28* (2006.01)
*B23P 15/04* (2006.01)
*B25B 27/14* (2006.01)
*F01D 11/08* (2006.01)

(52) U.S. Cl.

CPC ............... *F01D 11/005* (2013.01); *B23P 15/04* (2013.01); *B25B 27/14* (2013.01); *F01D 11/001* (2013.01); *F01D 11/08* (2013.01); *F01D 11/12* (2013.01); *F01D 25/246* (2013.01); *F01D 25/285* (2013.01); *F01D 11/127* (2013.01); *F05D 2200/11* (2013.01); *F05D 2220/3212* (2013.01); *F05D 2230/60* (2013.01); *F05D 2230/68* (2013.01); *F05D 2230/70* (2013.01); *F05D 2240/11* (2013.01); *F05D 2260/36* (2013.01); *F05D 2260/37* (2013.01); *Y10T 29/49233* (2015.01); *Y10T 29/49318* (2015.01); *Y10T 29/49321* (2015.01); *Y10T 29/53983* (2015.01)

(58) Field of Classification Search

CPC ..... F01D 11/08; F01D 25/246; F01D 11/005; F01D 25/285; F01D 25/28

See application file for complete search history.

(56) References Cited

U.S. PATENT DOCUMENTS

| | | | | |
|---|---|---|---|---|
| 5,593,277 A * | 1/1997 | Proctor et al. | | 415/173.1 |
| 6,575,697 B1 * | 6/2003 | Arilla et al. | | 415/173.1 |
| 8,100,644 B2 * | 1/2012 | Hazevis et al. | | 415/209.3 |
| 2002/0048512 A1 * | 4/2002 | Olivier et al. | | 415/173.1 |
| 2005/0002779 A1 * | 1/2005 | Tanaka | | 415/173.1 |
| 2005/0123389 A1 * | 6/2005 | Morris et al. | | 415/1 |

(Continued)

FOREIGN PATENT DOCUMENTS

| | | | |
|---|---|---|---|
| DE | 60122083 | T2 | 3/2007 |
| FR | 2891583 | A1 | 4/2007 |

*Primary Examiner* — Kristina Fulton
*Assistant Examiner* — Eugene G Byrd
(74) *Attorney, Agent, or Firm* — Barlow, Josephs & Holmes, Ltd.

(57) ABSTRACT

The present invention relates to a gas turbine having a housing (1), an outer sealing ring (2) that can be fastened detachably to the housing, a clamping member (3) for clamping the outer sealing ring and the housing together radially, and a rotation locking member that has at least one housing groove (10) and a radial flange (20) of the outer sealing ring that can be locked against rotation in the housing groove in form-fitting manner with play ($s_a$) in the axial and/or peripheral direction.

7 Claims, 2 Drawing Sheets

(56) References Cited

U.S. PATENT DOCUMENTS

| | | | | |
|---|---|---|---|---|
| 2007/0031243 | A1* | 2/2007 | Ruthemeyer et al. | 415/134 |
| 2007/0231132 | A1 | 10/2007 | Durand et al. | |
| 2009/0081037 | A1* | 3/2009 | Audeon et al. | 415/209.3 |
| 2009/0123273 | A1* | 5/2009 | Audeon et al. | 415/177 |
| 2009/0123278 | A1* | 5/2009 | Audeon et al. | 415/214.1 |
| 2009/0123280 | A1* | 5/2009 | Audeon et al. | 415/214.1 |
| 2012/0027572 | A1* | 2/2012 | Denece et al. | 415/127 |
| 2012/0156029 | A1* | 6/2012 | Karafillis et al. | 415/213.1 |
| 2012/0237342 | A1* | 9/2012 | Berche et al. | 415/174.1 |

* cited by examiner

GAS TURBINE

BACKGROUND OF THE INVENTION

The present invention relates to a gas turbine having a housing, an outer sealing ring that can be fastened detachably to the housing, and a clamping member for radially clamping together the outer sealing ring and the housing.

Known from US 2007/0231132 A1 is a gas turbine having a housing, an outer sealing ring that is fastened detachably to the housing, and a C-clip that clamps the outer sealing ring and the housing together radially. In this case, the outer sealing ring is fastened by friction fit in the peripheral direction.

In order to avoid vibration-induced micromovements between sealing ring and housing in the axial direction, the publication proposes arranging a radial flange of the sealing ring between the C-clip and the housing in an axially form-fitting manner. During operation, the C-clip is loaded by the force of gas in the direction of through-flow and thus clamps the radial flange of the sealing ring against the housing.

In the case of relative movements, particularly due to different thermal deformations, this clamping of sealing ring and housing exercises a high friction force that leads to a correspondingly high wear.

SUMMARY OF THE INVENTION

An object of an embodiment of the present invention is to provide an improved gas turbine.

The object is achieved by the gas turbine of the present invention. Advantageous embodiments of the invention are the subject of the present invention.

According to one aspect of the present invention, a gas turbine, particularly an aircraft-engine gas turbine, has a housing, an outer sealing ring that can be fastened, in particular is fastened, detachably to the housing, and a clamping member for clamping the outer sealing ring and the housing together radially, which in one embodiment clamps the outer sealing ring and the housing together radially and thus fastens them together by friction fit.

A rotation locking member or form-fit limitation of a relative movement between housing and outer sealing ring in the peripheral direction has one or more housing grooves that are distanced from one another in the peripheral direction, preferably equidistant, at least substantially, which in one embodiment extends, at least substantially in the axial direction. In the radial direction, the groove(s) can be open or closed radially outwardly, wherein radially outward open grooves can be advantageous with respect to manufacturing and/or assembly techniques; radially outward closed grooves, in contrast, can advantageously protect the rotation locking member.

In each case, one or more radial flanges of the outer sealing ring engage in one or more, preferably in all, housing grooves and thus secure (against rotation) housing and outer sealing ring in a in form-fitting manner in the peripheral direction. In this way, in one embodiment, a radial clamping or a friction fit between housing and outer sealing ring can be reduced and thus wear will also be reduced.

According to one aspect of the present invention, the radial flange or the radial flanges is (are) disposed in the housing groove or the housing grooves with play in the axial direction. In this way, in one embodiment, the high axial clamping force as a consequence of the gas force during operation as explained above, can be reduced and preferably avoided, and thus wear can be reduced.

Additionally or alternatively, the radial flange or the radial flanges can be disposed with play in the peripheral direction in the housing groove or housing grooves. In this way, in one embodiment, assembly can be simplified and/or manufacturing tolerances and/or thermal deformations can be compensated.

According to one aspect of the present invention, the housing groove(s) is (are) open on the front side against the direction of through-flow. In other words, the housing groove(s) discharge(s) into a front housing side in the direction of through-flow or open up into this side. In this case, in one embodiment, after removing the clamping member, the sealing ring advantageously can be pulled out from its mounted position from the front side of the housing or the housing, against the direction of through-flow, since, its radial flange(s) need not be removed from a closed groove counter to the direction of through-flow, for example, by initial tilting or tipping or the like.

In one embodiment, an axial length of the housing groove(s) from a front side of the housing is larger in the direction of through-flow than an axial wall thickness of the radial flange or the radial flanges. In this way, the above-described aspects of the open rotation locking member counter to the direction of through-flow are advantageously represented with axial play. An axial length in the present case is particularly understood as the length of a groove section in the axial direction, which extends in the direction of through-flow out from the opening in the front side of the housing and can receive the radial flange, thus in particular, a free path length of the radial flange in the direction of through-flow.

In one embodiment, the outer sealing ring is divided or segmented into two or more ring segments. In this way, advantageously, in one embodiment, the production, mounting and/or demounting can be improved.

In one embodiment, the clamping member is annular; in another embodiment, it is formed in ring segments. In particular, the clamping member can be designed in multiple parts and can have two or more ring segments distributed at equal distances over the circumference, in particular, at least substantially, whereby the sum of the circumferential lengths of the ring segments correspond to the circumferential length of the rotation locking member, but also, it is particularly clear that it can be smaller.

In particular, the clamping member can have one or more so-called C-clips. In general, the clamping member in one embodiment has a cross section having a C or U shape with a radially outer leg that is supported at an outer peripheral surface of the housing, and a radially inner leg that is supported at an inner peripheral surface of the outer sealing ring member, wherein the radially outer leg, the radial inner leg, and/or a combination of the two legs is (are) elastically deformed in order to thus clamp housing and outer sealing ring together radially.

In one embodiment, the gas turbine has a rotor that is disposed radially opposite the outer sealing ring member in the housing. The rotor, in particular, can be a frontmost first rotor closest to a gas inlet or in the direction of through-flow, and/or the outer sealing ring member can be a frontmost first outer sealing ring member closest to a gas inlet or in the direction of through-flow. If the gas turbine has a high-pressure turbine and a low-pressure turbine downstream to the latter in the direction of through-flow, the rotor or the outer sealing ring can be the first of either the high-pressure turbine or the low-pressure turbine. Correspondingly, the housing can be the housing of the high-pressure turbine or of the low-pressure turbine.

BRIEF DESCRIPTION OF THE DRAWING FIGURES

Additional advantageous enhancements of the present invention can be taken from the dependent claims and the following description of preferred embodiments. For this purpose and partially schematized, the following are shown:

DESCRIPTION OF THE INVENTION

Figure 2:
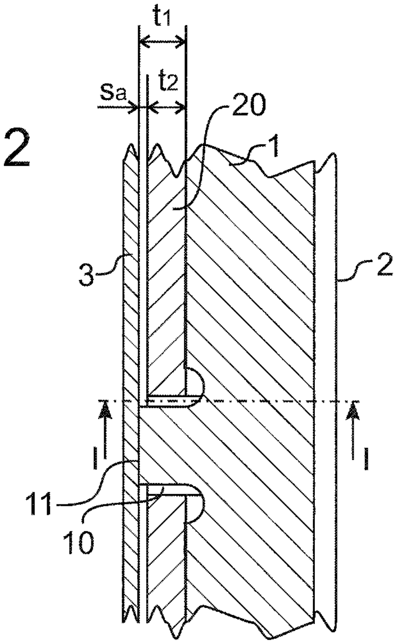
FIG. 2 shows a section along line II-II in FIG. 1.
Figure 3:
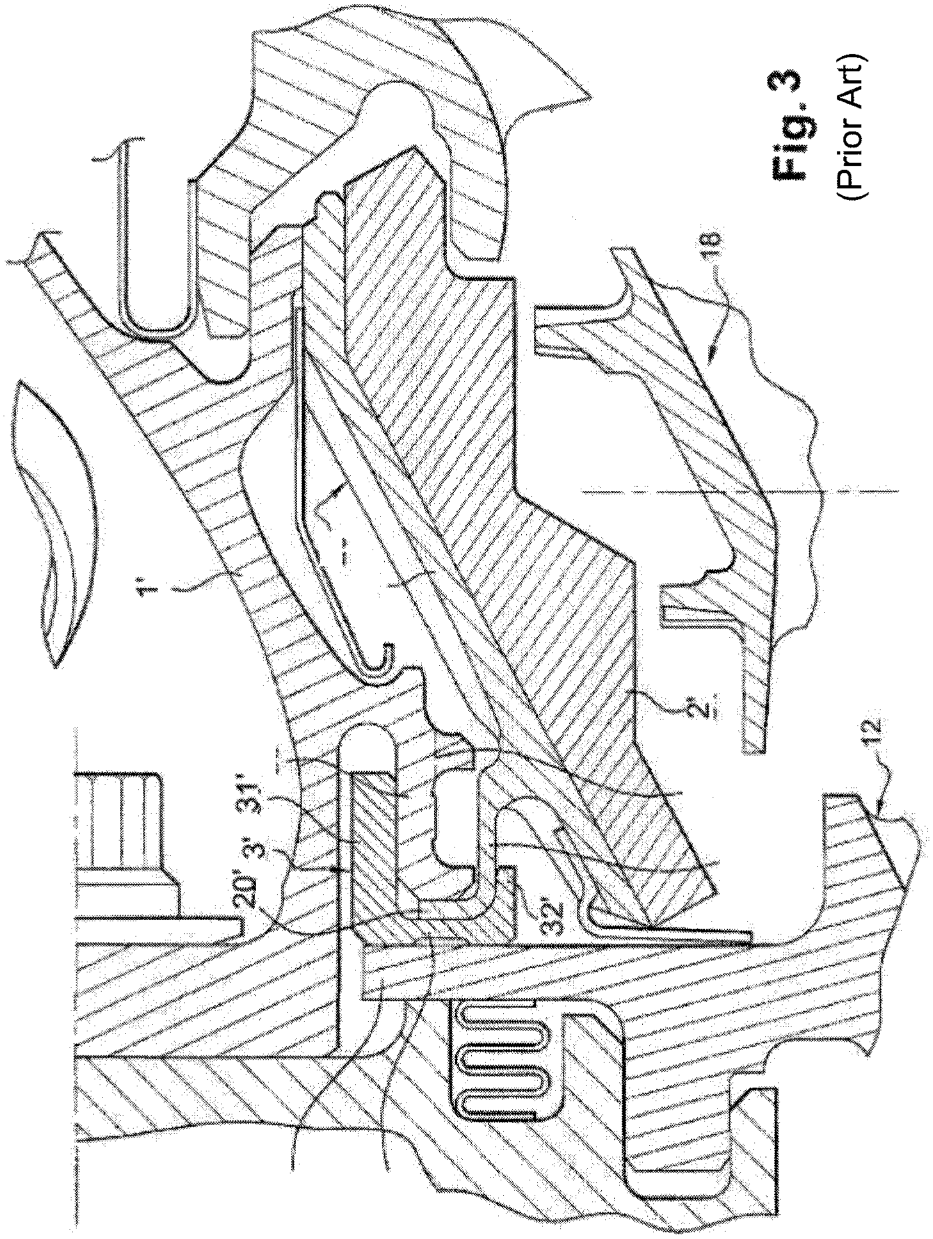
Fig. 3 (Prior Art)
FIG. 3 shows a portion of a gas turbine according to the prior art in a meridian section.

FIG. 3 shows a portion of a gas turbine according to FIG. 2 of US 2007/0231132 A1; reference is made to the description thereof in its entirety, and the content thereof is included in the present disclosure.

The gas turbine of FIG. 3 has a housing 1', to which an outer sealing ring 2' having a honeycomb seal is attached. For this, a C-clip 3' clamps an annular radial flange 20' of the sealing ring axially against the housing in a form-fitting manner. During operation, the C-clip is loaded by the force of gas on a preceding guide vane 12 in the direction of through-flow and thus clamps the radial flange of the sealing ring against the housing.

Figure 1:
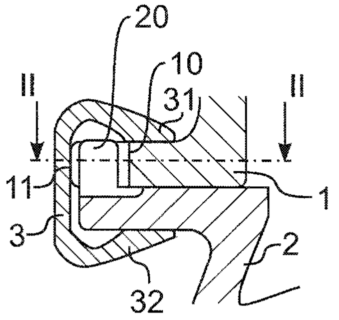
FIG. 1 shows a portion of a gas turbine according to one embodiment of the present invention in an illustration corresponding to the prior art representation in FIG. 3.

FIG. 1 shows a section along the line I-I in FIG. 2 of a portion of an aircraft-engine gas turbine according to an embodiment of the present invention in a representation corresponding to that in FIG. 3. FIG. 2 shows a section along line II-II in FIG. 1. Elements or members that correspond to one another are designated by the same reference numbers and distinguished by an apostrophe, as in prior art FIG. 3.

The gas turbine has a housing 1, an outer sealing ring 2, which is detachably fastened to the housing, and a clamping member 3, which radially (vertically in FIG. 1) clamps together the outer sealing ring and the housing and thus fastens them to one another in a friction fit.

Housing 1 and outer sealing ring 2 have a rotation locking member with several housing grooves 10 that are distanced from one another in the peripheral direction and that extend in the axial direction (horizontally in FIGS. 1, 2). The grooves are open radially outward (the top in FIG. 1) in the radial direction.

A radial flange 20 of the outer sealing ring 2 engages in each housing groove 10 of the housing 1 and thus secures housing and outer sealing ring in form-fitting manner in the peripheral direction (vertical in FIG. 2).

The radial flanges are disposed in the housing grooves with play $s_a$ in the axial direction. Additionally, the radial flanges also have play in the peripheral direction relative to the housing grooves, which can be recognized in FIG. 2.

The housing grooves are open on the front side counter to the direction of through-flow (toward the left in FIGS. 1, 2). In other words, the housing groove(s) discharge(s) into a front side of the housing 11 in the direction of through-flow. In this way, after removal of the clamping member 3, the sealing ring 2 advantageously can be pulled out from its mounting position shown in FIGS. 1, 2 from the front side of the housing 11 or the housing 1 axially counter to the direction of through-flow (toward the left in FIGS. 1, 2).

The axial length $t_1$ of the housing grooves 10 from the front side of the housing 11 in the direction of through-flow is greater than the axial wall thickness $t_2$ of the radial flange 20.

The outer sealing ring is divided or segmented into several ring segments (not shown).

The clamping member is formed in multiple parts shaped as ring segments and has several ring segments in the form of C-clips distributed over the circumference. Correspondingly, as can be seen in FIG. 1, the clamping member has a C-shaped cross section with a radially outer leg 31, which is supported at an outer peripheral surface of the housing 1, and a radially inner leg 32 that is supported at an inner peripheral surface of the outer sealing ring member 2, wherein the radially outer leg, the radial inner leg, and/or a combination of the two legs is (are) elastically deformed in order to thus clamp housing and outer sealing ring together radially.

The gas turbine has a first rotor 18 in the direction of through-flow (not shown in FIG. 1 but see FIG. 3).

Although exemplary embodiments have been explained in the preceding description, it shall be noted that a plurality of modifications is possible. In addition, it shall be noted that the exemplary embodiments only involve examples that in no way shall limit the scope of protection, the applications, and the structure. Rather, a guide is given to the person skilled in the art by the preceding description for implementing at least one exemplary embodiment, whereby diverse changes, particularly with respect to the function and arrangement of the described components, can be carried out without departing from the scope of protection, as results from the claims and combinations of features equivalent thereto.

What is claimed is:

1. A gas turbine comprising a housing (1), an outer sealing ring (2) that can be detachably fastened to the housing, and a clamping member (3) for radially clamping the outer sealing ring and the housing together, further comprising a rotation locking member that has at least one housing groove (10) and a radial flange (20) of the outer sealing ring that is locked against rotation in the housing groove in form-fitting manner with play ($s_a$) in the axial and/or peripheral direction;

wherein an axial length ($t_1$) of the housing groove from a front side of the housing (11) in the direction of through-flow is larger than an axial wall thickness ($t_2$) of the radial flange, resulting in the play in the axial direction such that the sealing ring can move axially with respect to the housing in an axial range equal to the axial length ($t_1$) of the housing groove; and wherein the play in the peripheral direction is provided by the housing groove being wider than the rotation locking member in the peripheral direction.

2. The gas turbine according to claim 1, wherein the housing groove is open on the front side counter to the direction of through-flow.

3. The gas turbine according to claim 1, wherein the outer sealing ring is segmented.

4. The gas turbine according to claim 1, wherein the clamping member is annular or formed in ring segments.

5. The gas turbine according to claim 1, wherein the clamping member has a cross section that is C-shaped or U-shaped with two legs (31, 32), one of which (31) is supported at an outer peripheral surface of the housing, and the other (32) of which is supported at an inner circumferential surface of the outer sealing ring member with elastic deformation of the clamping ring member.

6. The gas turbine according to claim 1, further comprising a first rotor (18) in the direction of through-flow, the first rotor (18) being disposed in the housing opposite the outer sealing ring member.

7. The gas turbine according to claim 1, wherein the clamping member, sealing member, and housing are configured such that, when the clamping member has been removed, the sealing ring can be removed by moving it in the axial direction.

* * * * *